United States Patent
Chae

(10) Patent No.: US 10,973,033 B2
(45) Date of Patent: Apr. 6, 2021

(54) METHOD AND DEVICE FOR DATA TRANSMISSION AND RESOURCE SELECTION BY MEANS OF TERMINAL MEASUREMENT IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 16/327,106

(22) PCT Filed: Aug. 22, 2017

(86) PCT No.: PCT/KR2017/009125
§ 371 (c)(1),
(2) Date: Feb. 21, 2019

(87) PCT Pub. No.: WO2018/038496
PCT Pub. Date: Mar. 1, 2018

(65) Prior Publication Data
US 2020/0296731 A1 Sep. 17, 2020

Related U.S. Application Data

(60) Provisional application No. 62/378,211, filed on Aug. 22, 2016.

(51) Int. Cl.
*H04W 72/08* (2009.01)
*H04W 72/02* (2009.01)
(Continued)

(52) U.S. Cl.
CPC ......... *H04W 72/085* (2013.01); *H04W 72/02* (2013.01); *H04W 72/044* (2013.01); *H04W 72/0486* (2013.01); *H04W 92/18* (2013.01)

(58) Field of Classification Search
CPC .............. H04W 72/02; H04W 72/044; H04W 72/0486; H04W 72/085; H04W 92/18;
(Continued)

(56) References Cited

U.S. PATENT DOCUMENTS 10,436,842 B2  10/2019  Uemura et al.
2015/0334760 A1  11/2015  Sartori et al.
(Continued)

FOREIGN PATENT DOCUMENTS

WO  2016047261 A1  7/2017
WO  2016076301 A1  8/2017

OTHER PUBLICATIONS

R1-167693: 3GPP TSG RAN WG1 meeting #86, Gothenburg, Sweden, Aug. 22-26, 2016, Intel Corporation, "Design options to support priority for V2V communication," (7 pages).
(Continued)

*Primary Examiner* — Mewale A Ambaye
(74) *Attorney, Agent, or Firm* — Dentons US LLP

(57) ABSTRACT

A method for transmitting a physical sidelink shared channel (PSSCH), by a device-to-device (D2D) terminal, in a wireless communication system involves receiving a physical sidelink control channel (PSCCH) and a PSSCH transmitted in a resource region indicated by the PSCCH. If an energy measurement value with respect to the PSSCH is greater than a preset threshold, the method further involves selecting a transmission resource excluding the resource region in which the PSSCH has been transmitted; and transmitting a D2D signal by means of the selected transmission resource, wherein the threshold has a value that varies in accordance with whether or not the PSSCH is retransmission or the redundancy version (RV) of the PSSCH.

14 Claims, 10 Drawing Sheets

(51) Int. Cl.
*H04W 72/04* (2009.01)
*H04W 92/18* (2009.01)

(58) Field of Classification Search
CPC .... H04W 72/12; H04W 72/1263; H04L 1/08; H04L 5/00
See application file for complete search history.

(56) References Cited

U.S. PATENT DOCUMENTS

| | | | |
|---|---|---|---|
| 2017/0041971 A1* | 2/2017 | Kim | H04W 72/12 |
| 2017/0285105 A1 | 10/2017 | Uemura et al. | |
| 2017/0347394 A1* | 11/2017 | Yasukawa | H04L 1/1896 |
| 2019/0245656 A1* | 8/2019 | Baghel | H04L 1/08 |
| 2019/0394786 A1* | 12/2019 | Parron | H04L 27/0006 |
| 2020/0112400 A1* | 4/2020 | Lee | H04W 76/11 |
| 2020/0267507 A1* | 8/2020 | Chae | H04W 4/029 |
| 2020/0275244 A1* | 8/2020 | Lee | H04W 84/18 |

OTHER PUBLICATIONS

R1-167009: 3GPP TSG RAN WG1 meeting #86, Goteborg, Sweden, Aug. 22-26, 2016, Ericsson, "Resource reselection," (7 pages).
R1-167586: 3GPP TSG-RAN WG1 Meeting #86, Gothenburg, Sweden, Aug. 22-26, 2016, InterDigital Communications, "Resource selection using SA decoding and energy measurements," pp. 1-4.
R1-166825: 3GPP TSG RAN WG1 Meeting #86, Gothenburg, Sweden Aug. 22-26, 2016, LG Electronics, "Sensing details for UE autonomous resource selection mode in PC5-based V2V," pp. 1-4.
R1-166257: 3GPP TSG-RAN WG1 #86, Aug. 22-26, 2016, Gothenburg, Sweden, Qualcomm Incorporated, "Details of sensing using autonomous resource selection for V2V," pp. 1-11.
R1-166169: 3GPP TSG RAN WG1 Meeting #86 R1-166169, Gothenburg, Sweden, Aug. 22-26, 2016 Huawei, HiSilicon, "Details of sensing procedure and resource (re)selection triggering mechanisms," pp. 1-6.

* cited by examiner (a)

(b)

(a) Normal CP (b) Extended CP

: PD2DSS   : SD2DSS   : PD2DSCH

: demodulation reference signal for PD2DSCH

: guard symbol for transmit/receive switching (a)

(b)

METHOD AND DEVICE FOR DATA TRANSMISSION AND RESOURCE SELECTION BY MEANS OF TERMINAL MEASUREMENT IN WIRELESS COMMUNICATION SYSTEM

This application is a 35 USC § 371 national stage entry of international application no. PCT/KR2017/009125 filed on Aug. 22, 2017, and claims priority to U.S. provisional application no. 62/378,211 filed on Aug. 22, 2016, all of which are hereby incorporated by reference in their entireties as if fully set forth herein.

TECHNICAL FIELD

The present disclosure relates to a wireless communication system, and more particularly, to a method and apparatus for performing a measurement, selecting transmission resources based on the measurement, and then transmitting data based on the selected transmission resources by a user equipment (UE).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to perform a measurement, select resources based on a differentiated threshold, and transmit data in the selected resources.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of transmitting a physical sidelink shared channel (PSSCH) by a device-to-device (D2D) user equipment (UE) in a wireless communication system includes receiving a physical sidelink control channel (PSCCH) and a PSSCH transmitted in a resource area indicated by the PSCCH, if an measurement value of energy of the PSSCH is larger than a predetermined threshold, selecting a transmission resource after excluding the resource area in which the PSSCH has been transmitted, and transmitting a D2D signal based on the selected transmission resource. The threshold has a different value according to whether the PSSCH is a retransmission, or according to a redundancy version (RV) of the PSSCH.

According to an embodiment of the present disclosure, a D2D UE for transmitting a PSSCH in a wireless communication system includes a transmitter, a receiver, and a processor. The processor is configured to receive a PSCCH and a PSSCH transmitted in a resource area indicated by the PSCCH through the receiver, to select, if an measurement value of energy of the PSSCH is larger than a predetermined threshold, a transmission resource after excluding the resource area in which the PSSCH has been transmitted, and to transmit a D2D signal based on the selected transmission resource through the transmitter. The threshold has a different value according to whether the PSSCH is a retransmission, or according to a redundancy version (RV) of the PSSCH.

The threshold may be smaller when the PSSCH is an initial transmission than when the PSSCH is a retransmission.

The threshold may be smaller when the RV is 0 than when the RV is 1.

Only when a congestion level is higher than a predetermined level, the threshold may be applied, the threshold having a different value according to whether the PSSCH is a retransmission, or according to the RV of the PSSCH.

The PSCCH and the PSSCH may be received in the same subframe.

The PSCCH and the PSSCH may be multiplexed in frequency division multiplexing (FDM).

The measurement value of energy of the PSSCH corresponds to a transmission power value of a demodulation reference signal (DMRS) of the PSCCH(본문에는 PSSCH 로 기재됨 문단 [120], [121] 참조).

The measurement value of energy of the PSSCH may be an energy measurement value of resources except for a resource in which the PSCCH is transmitted.

The measurement value of energy of the PSSCH may be a weighted average of an energy measurement result of the PSCCH and the measurement value of energy of the PSSCH.

The PSCCH and the PSSCH may be contiguous along a frequency axis.

If the PSCCH and the PSSCH are non-contiguous along the frequency axis, a weighting factor for the energy measurement result of the PSCCH may be 0.

The PSCCH and the PSSCH may be multiplexed in time division multiplexing (TDM).

If the PSCCH and the PSSCH are transmitted simultaneously, the PSCCH and the PSSCH may have different thresholds.

Advantageous Effects

According to the present disclosure, since resources are determined to be available for resource selection based on differentiated thresholds, differentiated protection may be provided for a signal of another UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the disclosure. In the drawings.

BEST MODE FOR CARRYING OUT THE INVENTION

Figure 1:
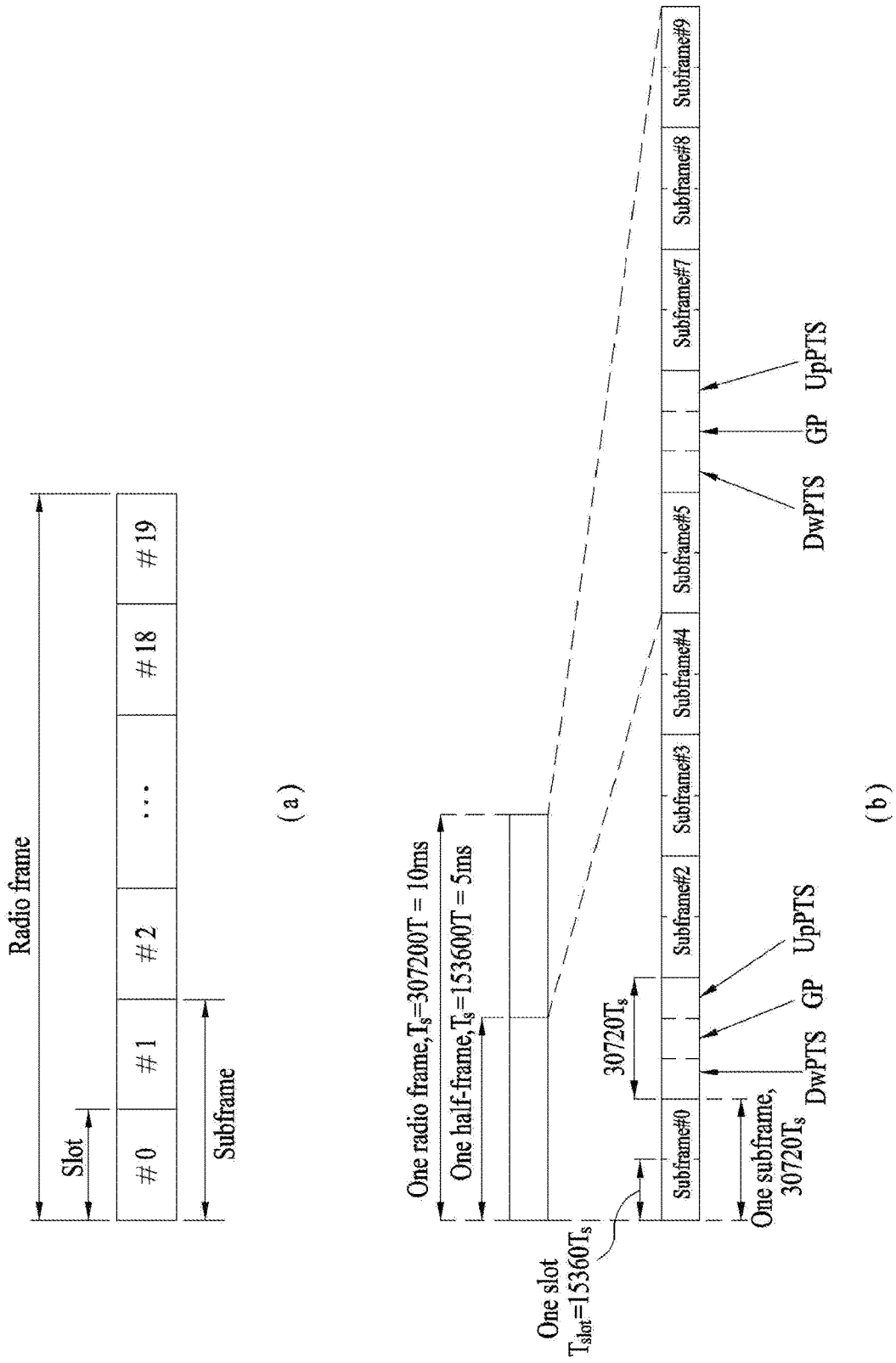
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
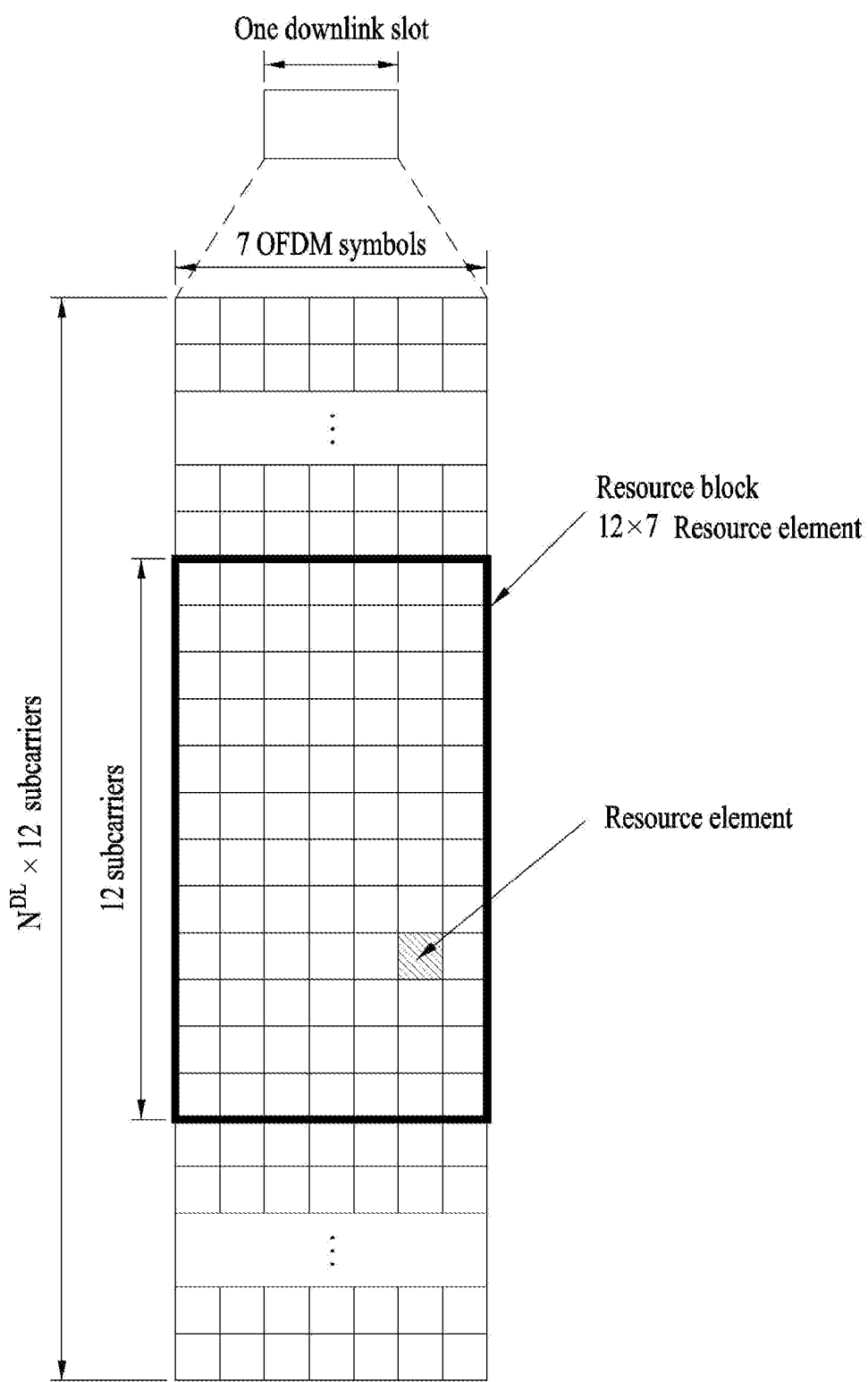
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
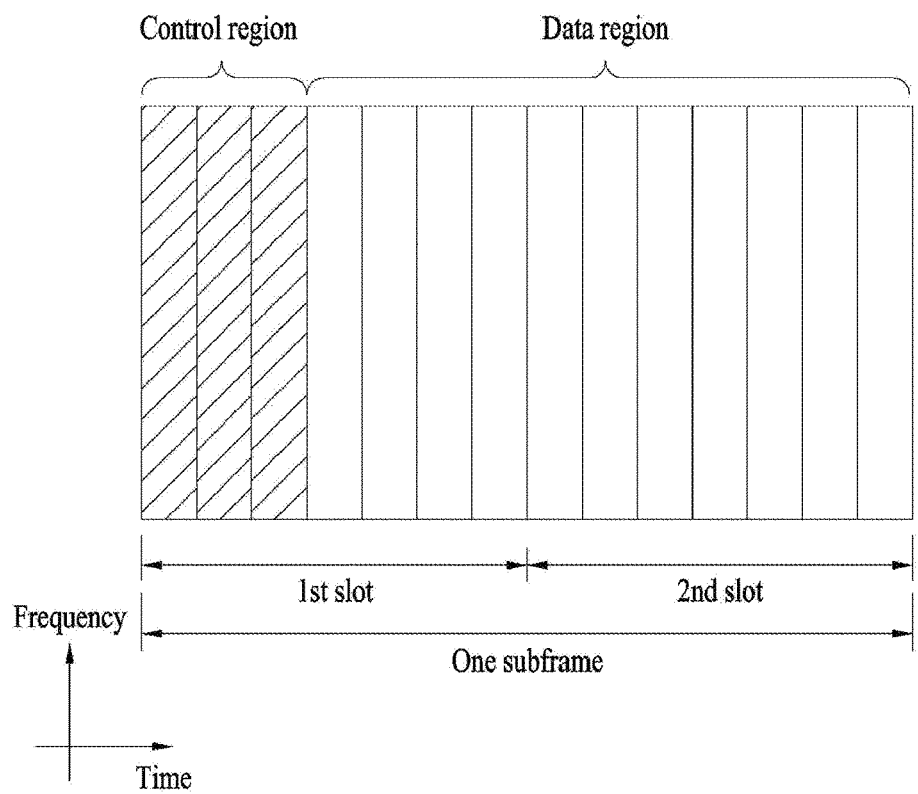
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
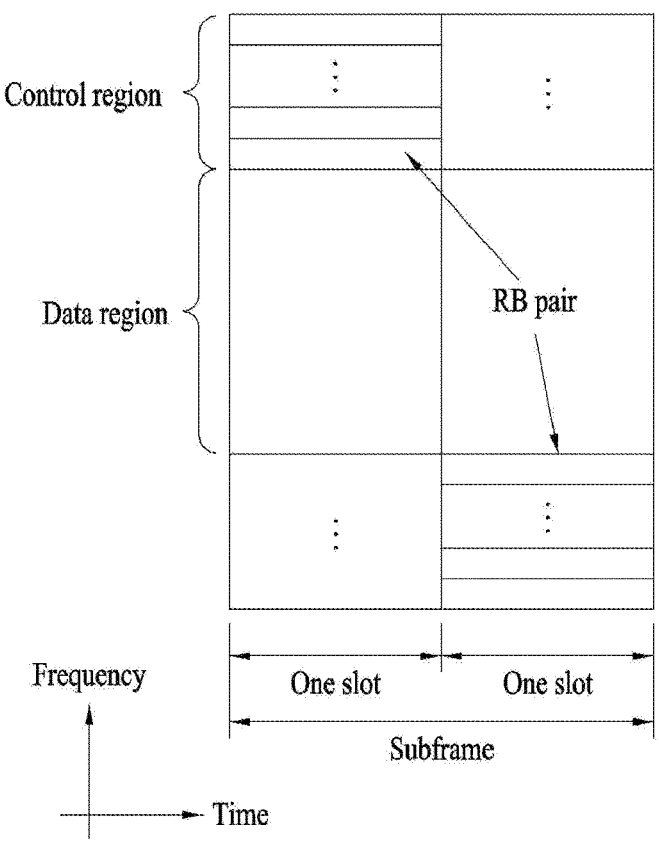
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
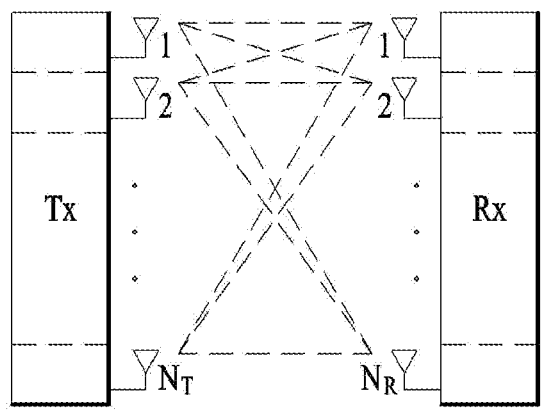
FIG. 5 is a view illustrating the configuration of a wireless communication system having multiple antennas.
Figure 5:
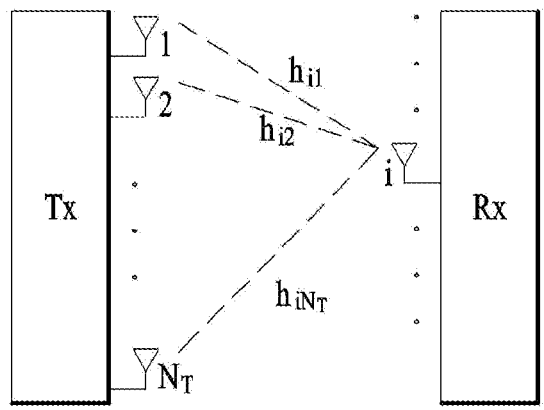

FIG. 5 is a diagram illustrating a configuration of a wireless communication system having multiple antennas.

As shown in FIG. 5(a), if the number of Tx antennas is increased to NT and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$

[Equation 5]

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & & \ddots & \vdots \\ h_{N_R1} & h_{N_R2} & \cdots & h_{N_RN_T} \end{bmatrix}$$

[Equation 8]

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = $$

[Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
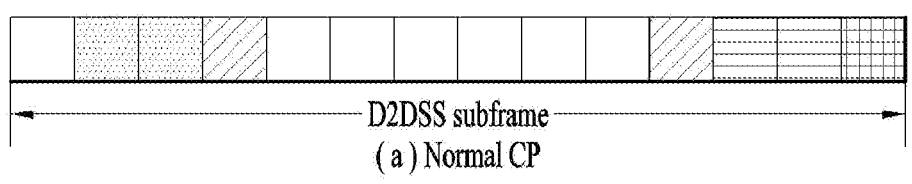
FIG. 6 is a view illustrating a subframe carrying a device-to-device (D2D) synchronization signal.
Figure 6:
Figure 6:
Figure 6:
Figure 6:
Figure 6:
Figure 6:

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
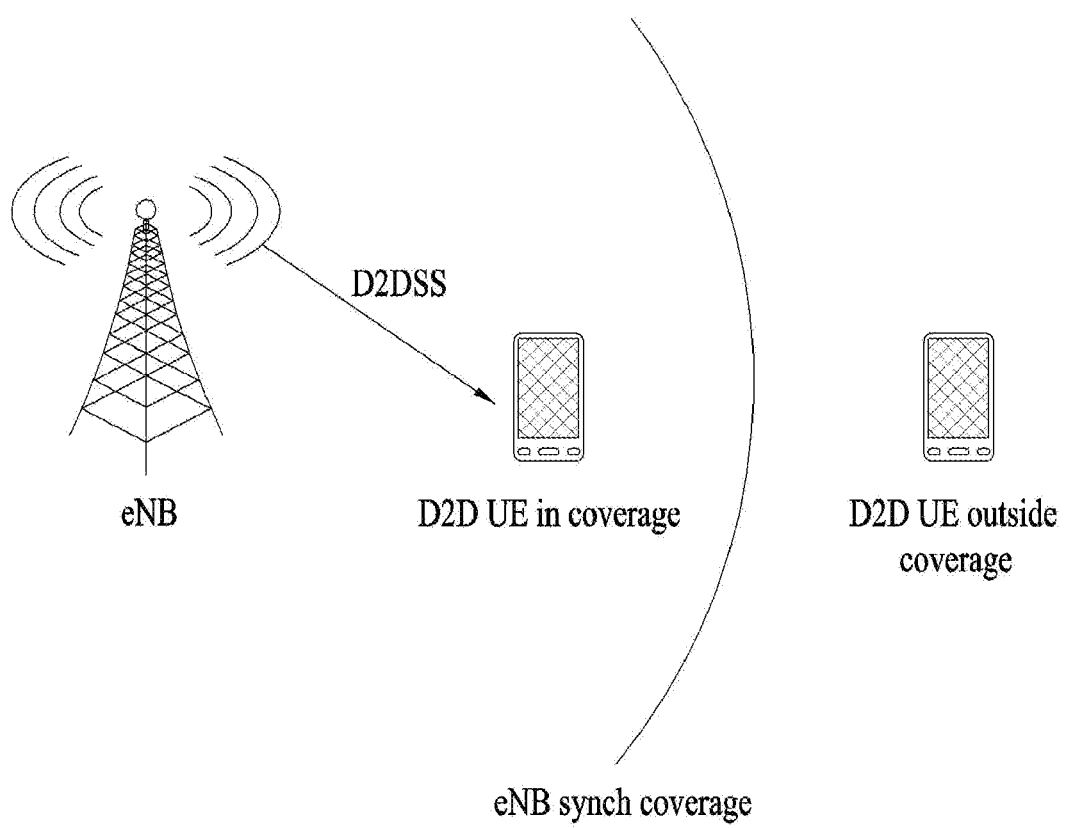
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
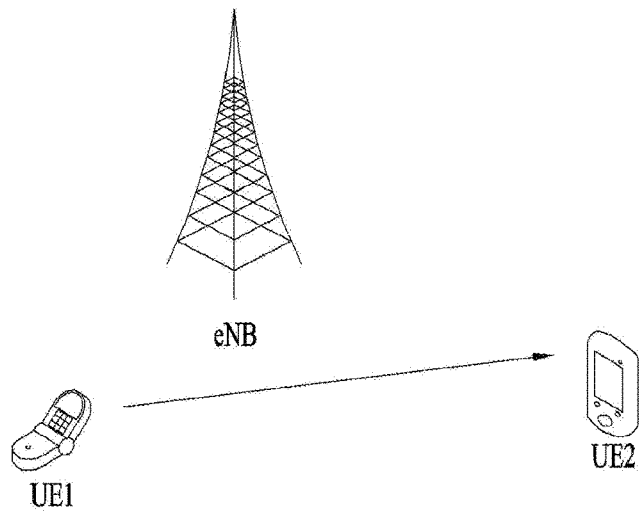
FIG. 8 is a view illustrating an exemplary D2D resource pool for D2D communication.
Figure 8:
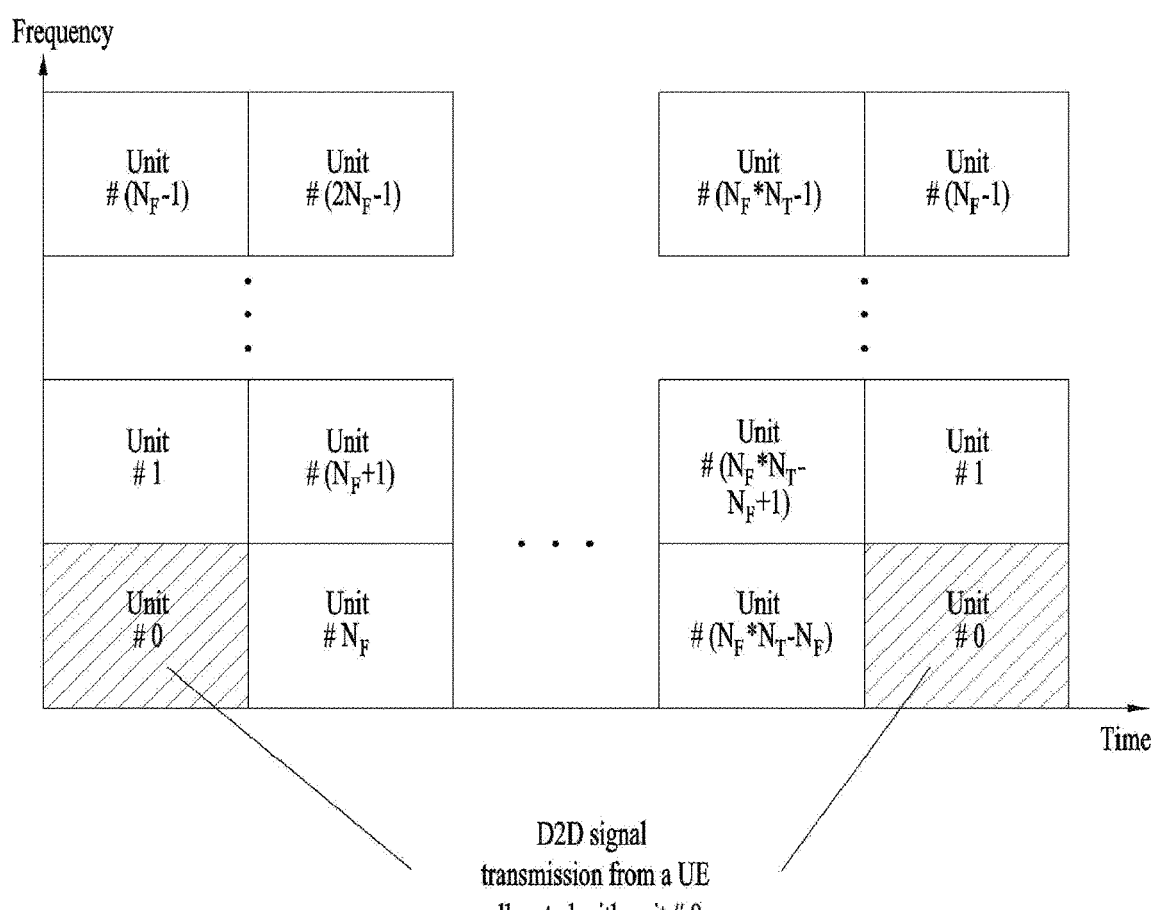

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
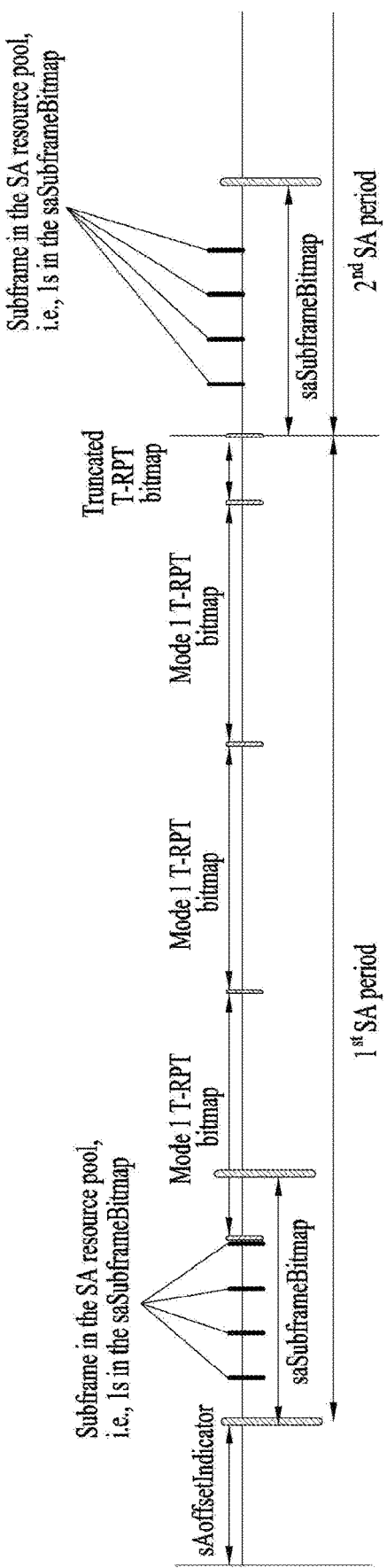
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

Meanwhile, in V2V communication, a cooperative awareness message (CAM) of a periodic message type, a decentralized environmental notification message (DENM) of an event triggered message type, and so on may be transmitted. The CAM may deliver dynamic state information about a vehicle, such as a direction and a speed, static data of the vehicle, such as dimensions, an ambient illumination state, basic vehicle information such as details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. Having a higher priority may mean that in the case of simultaneous transmission of messages at a UE, the UE transmits a higher-priority message above all, or a message having a higher priority earlier in time among the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Based on the foregoing description, a description will be given of, when a PSCCH (hereinafter, referred to as an SA) and/or a PSSCH (hereinafter, referred to as data) are transmitted in frequency division multiplexing (FDM) or time division multiplexing (TDM), sensing, selection of transmission resources based on the sensing, and so on at a UE that receives the SA and the data. The following description is made on the assumption that a UE is capable of performing sensing and resource reservation operations, and simultaneously transmitting control information and data in one subframe by sensing. Further, the following description is based on a resource exclusion operation and a resource selection operation as defined in Step 2 and Step 3. In Step 2, a UE excludes resources based on SA decoding and an additional condition. When an SA and its associated data are transmitted in the same subframe, option 2-1 (measurement on a PSCCH DMRS) is supported. In option 2-1, if a resource is reserved/indicated by a decoded SA and DMRS power per received RB exceeds a threshold, the resource is excluded. Meanwhile, when the resource is excluded in Step 2, the UE selects its transmission resource from resources which have not been excluded in Step 3 by one of the following options listed in [Table 1] below.

TABLE 1

| Option 3-1 | Step 3-1: The UE measures and ranks the remaining PSSCH resources based on total received energy, and selects a subset. Step 3-2: The UE compares the energy of the currently selected resource with the energy of the resources of the subset. If the energy of the current resource is a threshold above the energy of all the resources of the subset, then the UE selects one of the resources of the subset. If a semi-persistent period is triggered before reselection, the UE transmits the PSSCH in another resource in the subset identified in Step 3-1, and measures the energy of the currently selected resource for Step 3-2. Step 3-3: The UE randomly selects one resource from the subset. |
| --- | --- |
| Option 3-2 | Step 3-1: The UE measures and ranks the remaining PSSCH resources based on total received energy, and selects a subset. Step 3-2: The UE randomly selects one resource from the subset. |
| Option 3-3 | Step 3-1: The UE measures and ranks the remaining PSSCH resources based on total received energy, and selects a subset. Step 3-2: The UE selects a resource that minimizes frequency resource fragmentation from the subset. |
| Option 3-4 | Step 3-1: The UE measures RX power of PSSCH resources indicated by a decoded SA, sum the RX power as the total RX power of subframes, and sorts the subframes according to the total RX power. Step 3-2: A set of available subframes includes X subframes with highest total RX power and Y subframes with lowest total RX power. The UE randomly selects transmission subframe(s) from this set. Step 3-3: The UE randomly selects a frequency from the transmission subframe(s). |

Embodiments

Figure 10:
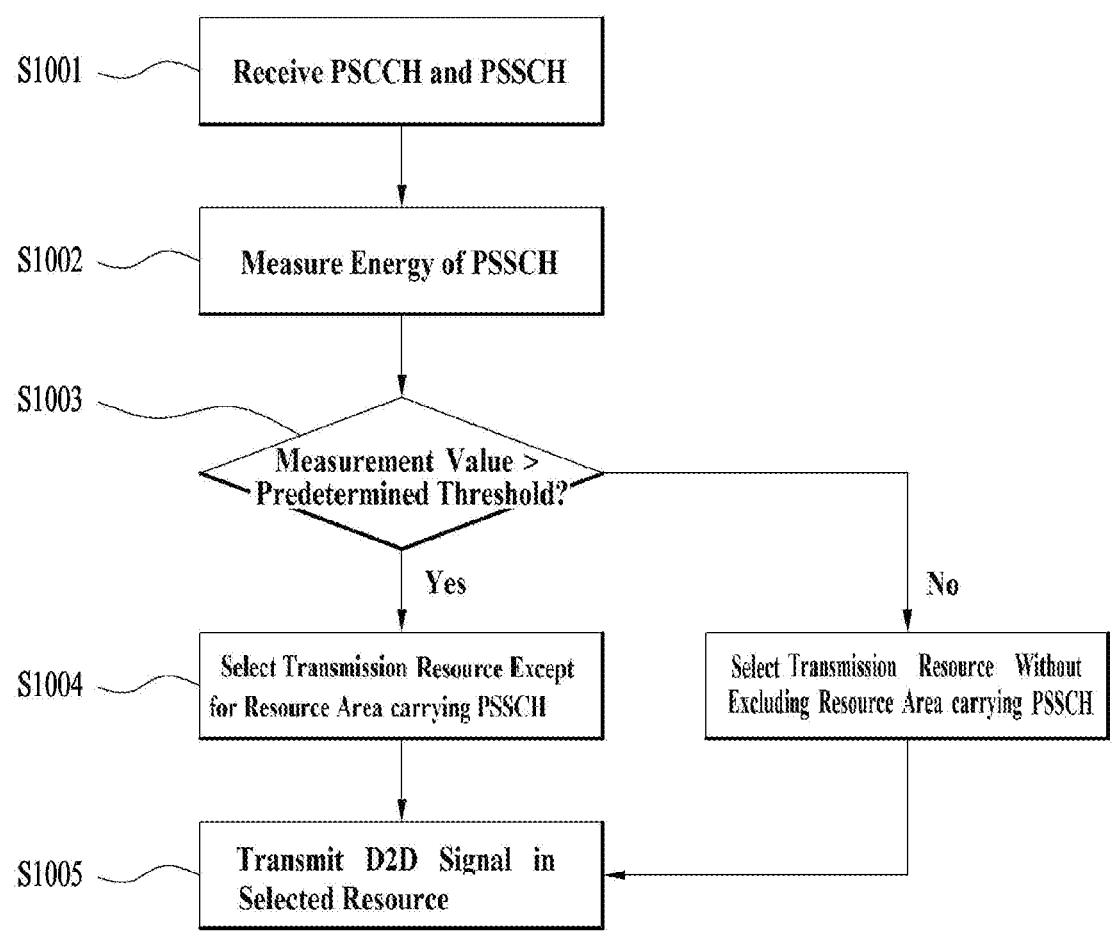
FIG. 10 is a flowchart according to an embodiment of the present disclosure.

Referring to FIG. 10, a UE according to an embodiment of the present disclosure receives a physical sidelink control channel (PSCCH) and a physical sidelink shared channel (PSSCH) transmitted in a resource area indicated by the PSCCH (S1001), and performs energy measurement on the PSSCH (S1002). The UE determines whether a measurement value resulting from the energy measurement is larger than a predetermined threshold (S1003). If the measurement value is larger than the predetermined threshold, the UE may select a transmission resource except for the resource area in which the PSSCH has been transmitted (S1004). The UE may transmit a D2D signal based on the selected transmission resource (S1005).

That is, if the measurement value of energy of the PSSCH is larger than the threshold, the UE excludes the corresponding resource from its candidate transmission resources, to thereby protect transmission in the corresponding resource.

The threshold may have a different value depending on whether the PSSCH is initially transmitted or retransmitted or according to the redundancy version (RV) of the PSSCH. Specifically, the threshold may be smaller for an initial transmission of the PSSCH than for a retransmission of the PSSCH. Or the threshold may be smaller for RV0 than for RV1. That is, a lower threshold is applied to the initial transmission or RV0, thereby excluding and thus protecting the corresponding resource more actively.

The measurement value of energy of the PSSCH may be i) the received power value of a DMRS of the PSSCH, ii) the energy measurement value of resources except for the resource in which the PSCCH is transmitted, or iii) the weighted average of an energy measurement result of the PSCCH and the measurement value of energy of the PSSCH. The values will be described respectively.

First, the measurement value of energy of the PSSCH may be the received power value of the DMRS of the PSSCH. That is, the UE may apply different DMRS thresholds to an initial transmission and a retransmission, or to RV0 and any other RV. That is, a lower threshold is applied to the initial transmission or RV0 than the retransmission or RV1 and RV2, so that even though low DMRS power is measured, the resource may be excluded. The UE, which has measured the DMRS power, performs resource selection in non-excluded resources. Thus, exclusion of a resource despite its low power means that the resource is not selected as available, thereby protecting a transmission of another UE with low power. Further, regarding reservation/indication of a resource by a decoded SA in the foregoing description, if the SA includes information about all retransmissions of a specific TB, resource information about all retransmissions of the specific TB may be obtained, when decoding of the SA is successful at least once. That is, even though SA decoding is failed in another subframe, the SA decoding is regarded as successful, and a DMRS at a corresponding data position may be measured.

Secondly, the measurement value of energy of the PSSCH may be the energy measurement value of the remaining PSSCH resources except for the resource carrying the PSCCH, or the received power value of the DMRS in pure PSSCH resources except for a resource area in which the PSCCH is transmitted or transmittable. That is, the resources in which the PSCCH is transmitted or transmittable may be excluded from the energy measurement of the PSSCH. In the latter case, since energy is measured only in an RB carrying the PSSCH, high energy in the specific RB, caused by PSCCH transmissions of other UEs may not be observed. On the contrary, the energy measurement of the PSSCH may be performed in all resources in which the PSSCH is transmitted, as indicated by the PSCCH. Or, resources of the PSCCH and resources of the PSSCH may be separately measured, so that the energy measurement of the PSCCH is used for PSCCH resource selection, and the energy measurement of the PSSCH is used for PSSCH resource selection.

Thirdly, the measurement value of energy of the PSSCH may be the weighted average of the measurement value of energy of the PSCCH and the measurement value of energy of the PSSCH. That is, the energy of a specific subchannel is calculated by separately measuring the energy of an SA resource and the energy of a data resource, and calculating the weighted sum of the measurements. A subchannel is a basic unit for signal transmission in the frequency domain. If an SA and data are successively transmitted in the frequency domain, a subchannel may refer to a combination of an SA resource and a data resource. The weighted sum may be predetermined, signaled by the network, or variable according to the RB size of data. This operation may be applied in a different manner, when an SA and data are transmitted non-successively from the perspective of a single UE. For example, if the SA and the data are transmitted non-successively in the frequency domain, the UE may always perform resource selection by using only the energy measurement of the resource area of the data. That is, if the PSCCH and the PSSCH are not contiguous along the frequency axis, a weighting factor for the energy measurement result of the PSCCH may be 0. If a one-to-one relationship is established between the SA and the data (e.g., a one-to-one relationship is established between one SA resource and one subchannel of data), resource selection may be performed, using the weighted sum of both the energy measurement result of the SA and the energy measurement result of the data. Similarly, weighting factors may be predetermined, signaled by the network, or variable according to the RB size of the data. Or resource selection for data may be performed, using only the energy measurement result of the data resource. Then, since there is no need for separately measuring the energy of the SA resource, UE complexity may be reduced.

Meanwhile, the afore-described threshold, which has a different value according to whether the PSSCH is retransmitted or according to the RV of the PSSCH, may be applied only when a congestion level is higher than a predetermined level. That is, an operation of applying a different threshold according to a retransmission (an operation of applying a different threshold according to an initial transmission or a retransmission) may be performed in a different manner according to a congestion level. Specifically, as described before, if the congestion level is high, a low threshold is applied only to the initial transmission (i.e., the initial transmission is protected in a congestion situation), while if the congestion level is low, a low threshold is applied to all transmissions to thereby exclude all resources. That is, since traffic is not congested and thus resources are sufficient, the low threshold is applied to all transmissions, thereby protecting both the initial transmission and the retransmission. In another example, if the congestion level is low, a low threshold is applied to all transmissions, so that all resources may be excluded fairly. Considering that even though the initial transmission and the retransmission are not protected with special care, reception is not affected in view of low congestion, this operation gives more regard to the freedom of resource selection.

In the foregoing description, the PSCCH and the PSSCH may be received in the same subframe. In addition, the PSCCH and the PSSCH may be multiplexed in FDM. The FDMed PSCCH and PSSCH may be contiguous or non-contiguous along the frequency axis.

Or, the PSCCH and the PSSCH may be multiplexed in TDM.

If the PSCCH and the PSSCH are simultaneously transmitted (in the same subframe), the PSCCH and the PSSCH may have different sensing measurement thresholds from the perspective of a UE that performs sensing. Specifically, if multi-cluster transmission is allowed from the perspective of a specific UE, an SA and data may be transmitted simultaneously (in the same subframe). Since certain power has been assigned to the SA, low DMRS power may be observed in a DMRS of the data simultaneously transmitted with the SA. In this case, DMRS power is low at the position of a corresponding data resource, and thus the data resource is highly likely not to be excluded in the afore-described DMRS threshold-based resource exclusion operation (Step 2). Then, the resource may be selected by another UE. To avert this case, when an SA and data are transmitted simultaneously, different DMRS measurement thresholds are applied during sensing. For this purpose, in the case where an SA and data are transmitted in FDM, a DMRS threshold or threshold offset may be predetermined or signaled by the network. The DMRS threshold may be signaled or predetermined, differently or separately from a DMRS threshold for the case of transmitting the SA and the data in TDM. If a subframe carrying the SA overlaps with a subframe carrying the data in TDM, and the UE does not support multi-cluster transmission, the UE may transmit only one of the SA and the data.

As described before, the use of a different threshold depending on whether a transmission is an initial transmission or a retransmission, or according to an RV may be understood as the use of a threshold per priority. That is, RV0 or an initial transmission is regarded as having a high priority, and thus a low (DMRS) threshold is set for RV0 or the initial transmission. Or, for a high-priority packet, a resource exclusion operation may be performed by applying the same threshold to both the initial transmission and the retransmission. Or, it may be regulated that for a high-priority packet, if at least one of retransmission resources is higher than a threshold, all retransmission resources are excluded. This is intended to protect even retransmission resources more actively for the high-priority packet. Or, when the UE decodes an SA with a higher priority than a signal transmitted by the UE, a different threshold may be set for a different priority, and a resource may be excluded accordingly. The above-described threshold per priority may be predetermined or signaled by the network.

After resources are excluded according to priorities as described above, the energy of a data resource is measured and resource selection is performed according to the energy measurement, as described with reference to Step 3. Herein, since resources have been excluded first for a packet having a higher priority than a transmitting UE, relatively low energy is likely to be observed in resources of the remaining UEs having high priorities, except for UEs/packets having the corresponding high priority. In this case, the UE is highly likely to first select resources used for a high-priority packet, and thus an offset may be set for energy measurement according to a priority even in Step 3. The offset may be set to the difference between per-priority thresholds in Step 2. This operation may ensure protection of resources used by a high-priority UE.

The foregoing descriptions are applicable to UL or DL, not limited to direction communication between UEs. Herein, an eNB or a relay node may use the proposed methods.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Apparatus Configuration According to Embodiment of the Present Disclosure

Figure 11:
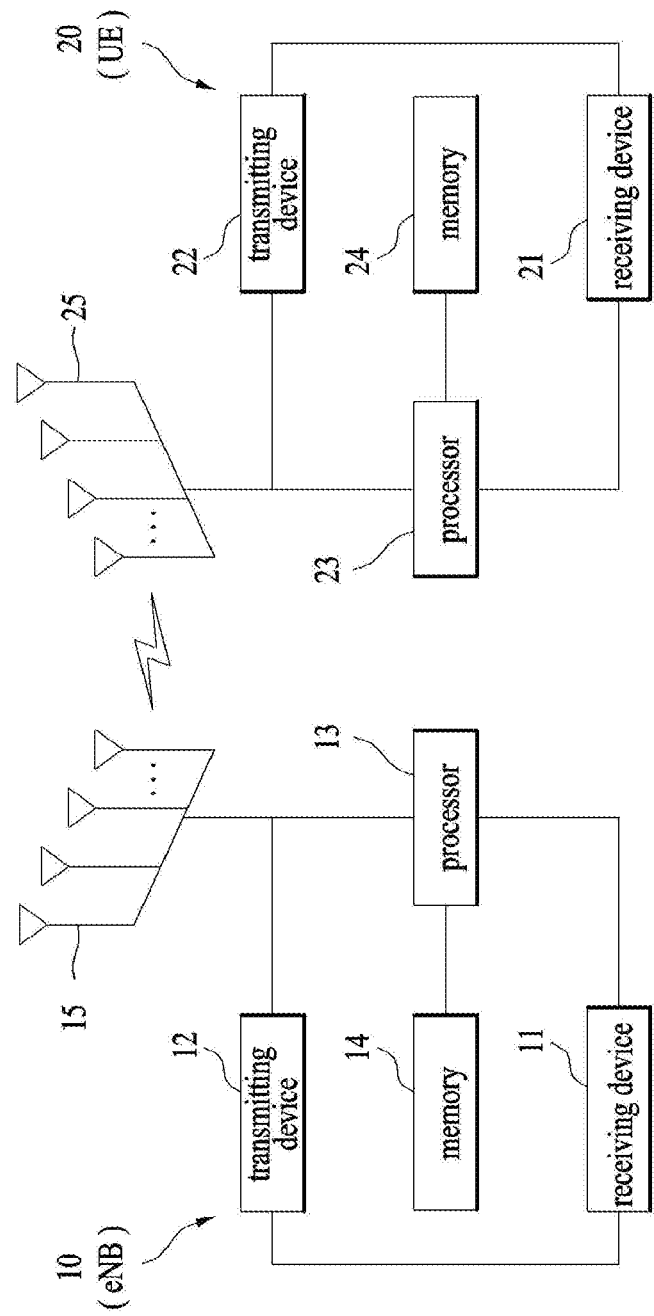
FIG. 11 is a diagram showing a configuration of a transmission apparatus and a reception apparatus.

FIG. 11 is a block diagram of a transmission point and a UE according to an embodiment of the present disclosure.

Referring to FIG. 11, a transmission point 10 according to the present disclosure may include a receiver 11, a transmitter 12, a processor 13, a memory 14, and a plurality of antennas 15. The plurality of antennas 15 mean that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10. The processor 13 of the transmission point 10 according to an embodiment of the present disclosure may process requirements of each of the foregoing embodiments.

Besides, the processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 11, a UE 20 according to the present disclosure may include a receiver 21, a transmitter 22, a processor 23, a memory 24, and a plurality of antennas 15. The plurality of antennas 25 mean that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

The processor 23 of the UE 20 according to an embodiment of the present disclosure may process requirements in each of the foregoing embodiments. Specifically, the processor receives a PSCCH and a PSSCH in a resource area indicated by the PSCCH through the receiver. If the energy measurement of the PSCCH is larger than a predetermined threshold, the processor may select a transmission resource, excluding the resource area carrying the PSSCH, and transmit a D2D signal based on the selected transmission resource through the transmitter. The threshold has a different value according to whether the PSSCH is a retransmission or not, or according to the RV of the PSSCH.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 11, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a physical sidelink shared channel (PSSCH) by a device-to-device (D2D) user equipment (UE) in a wireless communication system, the method comprising:
    receiving a physical sidelink control channel (PSCCH) and the PSSCH which is transmitted in a resource area indicated by the PSCCH;
    selecting a transmission resource after excluding the resource area in which the PSSCH has been transmitted, based on a measurement value of energy of the PSSCH being larger than a predetermined threshold; and
    transmitting a D2D signal based on the selected transmission resource,
    wherein the threshold has a different value based on at least one of the PSSCH being a retransmission or a redundancy version (RV) of the PSSCH, or whether the PSCCH and the PSSCH are received in a same subframe, and
    wherein a threshold related to the PSSCH of an initial transmission is smaller than a threshold related to the PSSCH of a retransmission.

2. The method according to claim 1, wherein a threshold related to an RV of 0 is smaller a threshold related to an RV of 1.

3. The method according to claim 1, wherein based on a congestion level being higher than a predetermined level, a threshold having a different value, based on the PSSCH being a retransmission or the RV of the PSSCH, is applied.

4. The method according to claim 1, wherein the PSCCH and the PSSCH are received simultaneously.

5. The method according to claim 1, wherein the PSCCH and the PSSCH are multiplexed in frequency division multiplexing (FDM).

6. The method according to claim 1, wherein the measurement value of energy of the PSSCH corresponds to a reception power value of a demodulation reference signal (DMRS) of the PSSCH.

7. The method according to claim 1, wherein the measurement value of energy of the PSSCH is an energy measurement value of resources except for a resource in which the PSCCH is transmitted.

8. The method according to claim 1, wherein the measurement value of energy of the PSSCH is a weighted average of an energy measurement result of the PSCCH and the measurement value of energy of the PSSCH.

9. The method according to claim 8, wherein the PSCCH and the PSSCH are contiguous along a frequency axis.

10. The method according to claim 8, wherein based on the PSCCH and the PSSCH being non-contiguous along the frequency axis, a weighting factor for the energy measurement result of the PSCCH is 0.

11. The method according to claim 1, wherein the PSCCH and the PSSCH are multiplexed in time division multiplexing (TDM).

12. The method according to claim 4, wherein the PSCCH and the PSSCH have different thresholds.

13. A device-to-device (D2D) user equipment (UE) for transmitting a physical sidelink shared channel (PSSCH) in a wireless communication system, the D2D UE comprising:
    a transmitter and a receiver; and
    a processor, wherein the processor is configured to:
    receive a physical sidelink control channel (PSCCH) and the PSSCH transmitted in a resource area indicated by the PSCCH through the receiver;
    select, based on a measurement value of energy of the PSSCH being larger than a predetermined threshold, a transmission resource after excluding the resource area in which the PSSCH has been transmitted; and
    transmit a D2D signal based on the selected transmission resource through the transmitter,
    wherein the threshold has a different value based on at least one of the PSSCH being a retransmission or a redundancy version (RV) of the PSSCH, or whether the PSCCH and the PSSCH are received in a same subframe, and
    wherein a threshold related to the PSSCH of an initial transmission is smaller than a threshold related to the PSSCH of a retransmission.

14. The method according to claim 1, wherein a threshold related to the PSCCH and the PSSCH being received in the same subframe is different from a threshold related to the PSCCH and the PSSCH being received in different subframes.

* * * * *